Nov. 14, 1967      C. L. MERETT      3,352,527

ADJUSTABLE WALL MOUNT

Filed Aug. 25, 1966

INVENTOR.

CECIL L. MERETT

BY

ATTORNEYS

United States Patent Office
3,352,527
Patented Nov. 14, 1967

3,352,527
ADJUSTABLE WALL MOUNT
Cecil L. Merett, 1051 S. Decatur St.,
Denver, Colo. 80219
Filed Aug. 25, 1966, Ser. No. 575,177
10 Claims. (Cl. 248—480)

This invention relates to wall-mounting brackets and, more specifically, to an adjustable wall-mirror support which enables the mirror to be tilted forwardly, rearwardly and from side-to-side.

Large plate glass mirrors are quite heavy and require a secure device for fastening same to the supporting wall surface. Ordinary picture hangers are seldom satisfactory for this purpose; hence, most mirrors are fastened in flush relation to the wall by brackets that overlap the edges and are placed at several locations around the periphery thereof. Those mirrors that are framed and, for this reason, cannot be supported by the edges, generally employ some type of special heavy-duty mounting hardware on the back such as, for example, one or more apertured clips adapted to receive the head of a screw held in the wall securely by a rowel plug or some analogous type of special-purpose fastener. While either of the foregoing methods result in a secure mounting, it is difficult to hang the mirror on the screw heads which are almost flush with the wall and, more important, the mirror must remain fixed in one position and cannot be moved around to suit the needs of the user.

There are, of course, some instances in which the sole function of a mirror is to serve as a decorative piece and it thus becomes somewhat immaterial what a person is able to see reflected therein. In other applications, however, the mirror is positioned to be used for its intended purpose, namely, a reflecting surface even though it may incidentally be decorative. As such, it would be highly advantageous to be able to tilt same back-and-forth as well as from side-to-side in order that the desired area be reflected therein.

It has now been found in accordance with the teaching of the instant invention that a mirror-mounting bracket possessing the aforementioned advantageous features can, in fact, be made which, in addition, provides a secure mount despite its adjustable features. The resulting unit also facilitates hanging the mirror because the adjustable nature of the bracket leaves ample space to work in between the mirror and the wall. Furthermore, the construction of the bracket is such that a toggle-action acting between each pair of swingable mirror-supporting arms functions to hold the mirror flush against the wall.

It is, therefore, the principal object of the present invention to provide a novel and improved mirror-mounting bracket.

A second objective of the invention herein disclosed and claimed is the provision of a wall bracket for mounting mirrors and the like that is adjustable so that the mirror supported thereby can be tilted forwardly, rearwardly and from side-to-side.

Another object is to provide a mirror bracket wherein a novel spring-biased arm construction keeps the mirror in adjusted position.

Still another objective is the provision of a device of the type aforementioned that includes a toggle-type joint which functions to keep the mirror supported thereon flush against the wall.

An additional object is to provide a mirror mounting unit that facilitates hanging heavy mirrors.

Further objects of the invention are to provide a mirror mounting bracket that is simple to install, lightweight, rugged, relatively inexpensive, safe, versatile and adaptable for use on many different shapes and styles of mirrors, pictures and other objects of like nature.

Other objectives will be in part apparent and in part pointed out specifically herein after in connection with the description of the drawings that follows, and in which.

Figure 1:
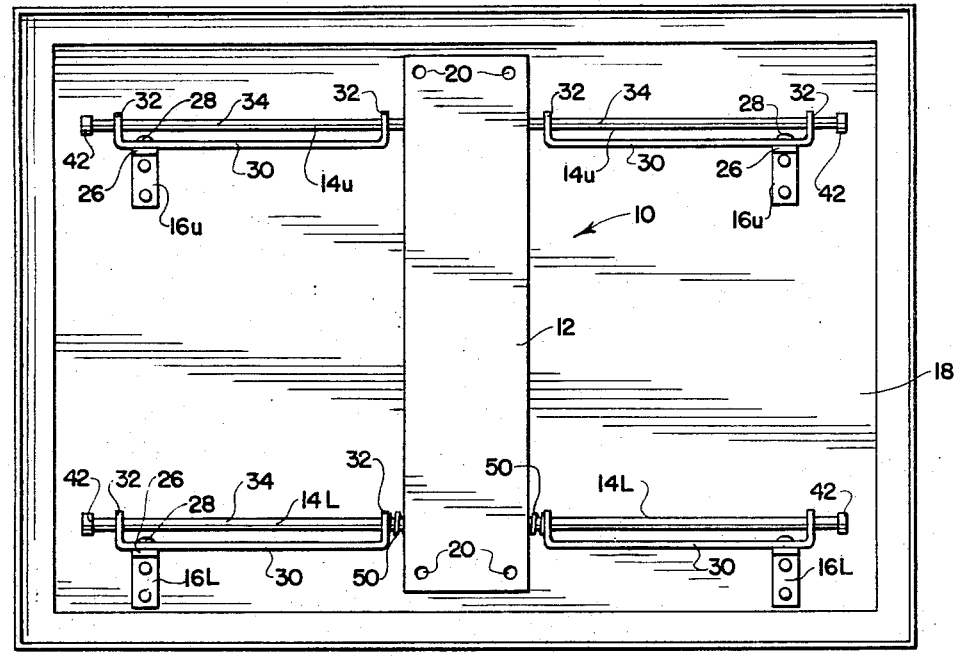
FIGURE 1 is a rear elevation showing the mirror mounting bracket of the present invention in place on the back of a mirror.
Figure 2:
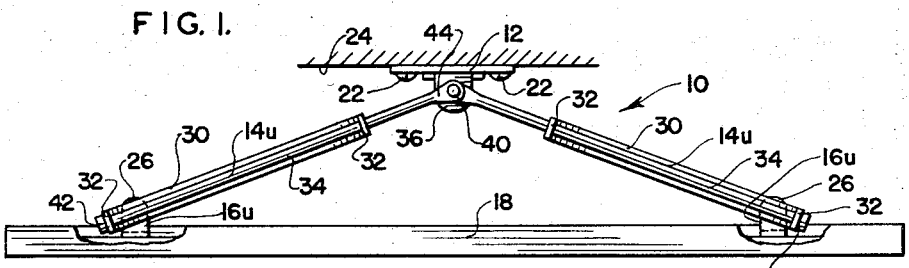
FIGURE 2 is a top plan view showing the bracket attached to a wall surface with the upper pair of arms in extended position.

Referring now to the drawings for a detailed description of the present invention and, initially, to FIGURES 1 and 2 for this purpose, reference numeral 10 has been chosen to designate the bracket in its entirety and it will be seen to include a wall plate 12, upper and lower pairs of pivoted arms 14U and 14L, and clips 16 by which the arms are fastened to the rear face of the mirror 18. Wall plate 12 comprises nothing more than a vertically-elongated flat metal plate containing a plurality of apertures 20 for attaching same to a wall surface. Simple screw fasteners 22 have been shown in FIGURE 2 as the means for fastening the wall plate to wall 24; however, this presupposes that the wall is capable of supporting the load of a heavy mirror or like structure without the screws pulling loose. If not, rowel plugs (not shown) or some other type of conventional heavy-duty fastener should be employed to anchor the wall plate securely to the wall in flush relation thereto.

Inverted L-shaped brackets 16 are fastened to the back of the mirror with suitable fasteners and they are arranged in vertically-spaced pairs 16U and 16L. The brackets of each pair are arranged in horizontal alignment with one another spaced equi-distant on opposite sides of the centerline of the mirror. The outturned leg 26 of each bracket 16 is pivotally attached by means of pivot pin 28 (FIGURE 1) near the outboard end of the horizontally-elongated U-shaped members 30 that comprise portions of the arm subassemblies 14. The above-mentioned points of pivotal attachment are located such that the inboard extremities of the arm subassemblies 14 can swing away from the back of the mirror into the position shown in FIGURE 2. The upturned ends 32 of these U-shaped members are each apertured to receive rods 34 for longitudinal slidable movement therein.

Figures 3, 4:
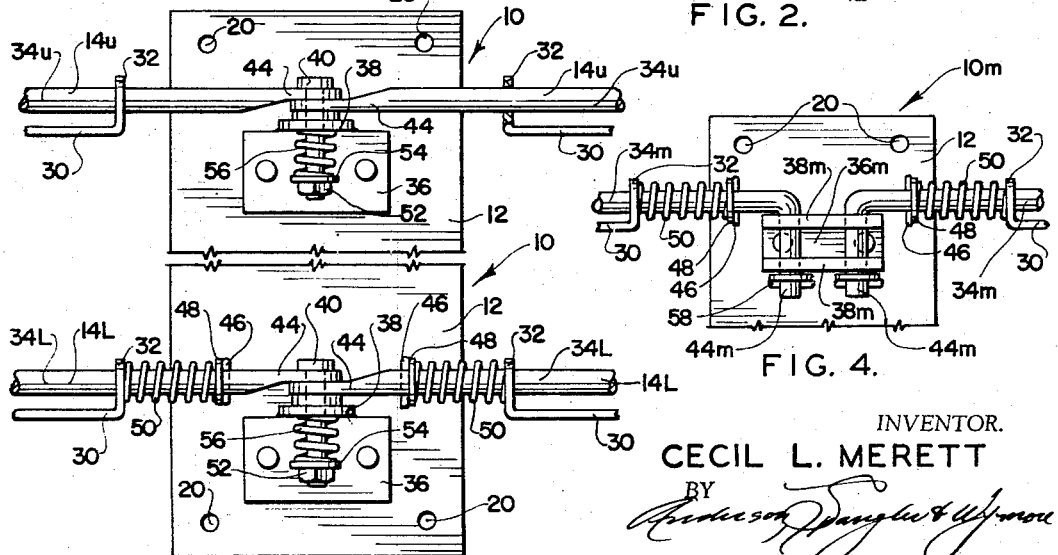
FIGURE 3 is a fragmentary front elevation to an enlarged scale of the bracket itself.
FIGURE 4 is a fragmentary front elevation similar to FIGURE 3 but showing a slightly modified form of the bracket.

Next, with particular reference to FIGURES 2 and 3, it will be seen that still another pair of inverted generally L-shaped brackets 36 are fastened to the front face of wall plate 12 in vertically-spaced relation to one another. The outturned portion 38 of the latter brackets is provided with a hole that receives central pivot pins 40 that are arranged one above the other in co-axial alignment.

Now, rods 34 have a head 42 on their remote extremities that abuts against the outer upturned end 32 of U-shaped member 30 when the bracket occupies the extended position of FIGURE 2. In this position, the rod subassemblies form the equal legs of an isosceles triangle while the mirror 18 forms the base. The rods 34 are substantially longer than the space separating the upturned ears 32 of the U-shaped element so that they project well beyond the extremities of the latter. The adjacent ends 44 of the rods 34 are flattened and provided with apertures adapted to pivotally receive central pivot pin 40.

The vertical plane defined by the parallel axes of pivot pins 28 is spaced rearwardly of the back of the mirror such that when the rod subassemblies are moved into their retracted positions, the axis of central pivot pin 40 moves past this plane or across center to form a toggle connection. In other words, with the bracket fully retracted, the rod subassemblies slope rearwardly from central pivot 40 toward the wall a slight amount. An examination of FIGURE 2 will show that any of the adjacent pairs of rod subassemblies can be actuated independently of the remaining pair to accomplish the desired mirror tilt or all four can be actuated together. For instance, if one wishes to swing the mirror from side-to-side about a vertical axis passing through the central pivots 40, he need only collapse the rod subassemblies on one side while leaving the adjacent pair on the other side extended. Similarly, to tilt the mirror forward, the bottom pair 14L are collapsed into retracted position and the top pair 14U are extended. Reversal of this procedure will, of course, tilt the mirror backward.

In order to accomplish the full set of adjustments described above, it is necessary to employ two pairs of rod subassemblies 14U and 14L; however, if one is only interested in moving the mirror between a flush position against the wall and a forwardly tilted position, only the upper pair of bracket subassemblies 14U need be used. This presupposes that the mirror, picture or like item is not overly heavy, otherwise the two sets of brackets are necessary to carry the weight.

Referring now specifically to FIGURE 3, it will be seen that the design of the upper and lower rod subassemblies differ slightly from one another in the particular form illustrated. Rods 34L are preferably provided with stops spaced inwardly of the inner ears 32 of the U-shaped elements. These stops comprise, as shown, a pin 46 passing through the rod and a washer 48 abutting thereagainst. A loose-wound helical compression spring 50 fits on that portion of the rod 34L left between the washer 48 and the adjacent ear 32. The functions performed by this compression spring assembly are as follows. First of all, with the lower pair of rod subassemblies in retracted position, springs 50 are under nearly total compression and they operate to hold central pivot 40 in its "over-center" position. Thus, when moving these lower rod subassemblies from their retracted to extended positions, springs 50 are further compressed as the rods 34L move into an "in line" relation to one another as the central pivot 40 passes over center, whereupon, the springs then press upon the U-shaped members and bias the outer ears thereof against the heads 42 on the rod ends as they decompress.

The second function performed by these springs 50 is to hold the lower set of rod subassemblies in extended position. The weight of a heavy mirror is such that it will act to collapse the lower set of rod subassemblies unless the springs 50 are used to prevent this from taking place.

An identical construction may, if desired, be employed on the upper pair of rod subassemblies 14U; however, it is unnecessary to hold them in extended position as the weight of the mirror acting to pull the upper edge away from the wall will do so without spring assistance. There might be some slight advantage in having the springs on the upper set of rod subassemblies for the purpose of holding them in the retracted "over-center" position, but even this has been found unnecessary.

FIGURE 3 also reveals the construction of central pivot 40. It is possible to thread nut 52 and washer 54 up against the under side of outturned ear 38 of bracket 36 with just the right degree of frictional pressure to maintain the various adjusted positions of the assembly while, at the same time, leaving it loose enough to permit these adjustments to be made easily. On the other hand, this can be a fairly delicate adjustment and one that varies with the particular mirror which means that it has to be performed on the wall reaching in between the mirror and the wall. For this reason, it has been found preferable to elongate pivot 40 and place a compression spring 56 on the shank thereof between washer 54 and ear 38 to maintain a constant frictional contact between the several bearing surfaces at this pivotal connection. These springs also act to bias their respective pivot pins 40 into vertically aligned position thus preventing the mirror from turning so that the corners on one side drop below those on the other.

Finally, with reference to FIGURE 4, a slightly modified version of the bracket 10m has been illustrated that is primarily useful in hanging extra-heavy mirrors. The wall plate 12 remains the same as before but the brackets 36m attached thereto are modified to include a pair of vertically-spaced parallel outturned ears 38m that are wider and contain two transversely-spaced apertures adapted to pivotally receive the downturned ends 44m of modified rods 34m. The two sets of holes are vertically aligned and, therefore, function in cooperation with the downturned rod ends 44m that pivot therein to resist any twisting movement thus eliminating the need for springs 56 of the earlier embodiment. Accordingly, the ends of the rod are fastened within the bracket 36m by a pin 58 and washer 60. In all other respects, the construction and operation of the two versions of the bracket remain identical.

Having thus described the several useful and novel features of the adjustable wall-mirror support of the instant invention, it will be apparent that the many worthwhile objectives for which it was developed have been achieved. Although but a few embodiments of the invention have been illustrated and described herein, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. An adjustable wall mount for mirrors and the like which comprises: at least one set of three bracket-forming means each of which includes a vertically-disposed planar surface and at least one outturned ear presenting a horizontal bearing surface, the vertically-disposed surface of one of said bracket-forming means being adapted for attachment to a wall surface with the ear projecting forwardly therefrom, and the vertically-disposed surfaces of the remaining pair of bracket-forming means being adapted for attachment to the rear face of an object to be hung in horizontally-spaced relation on opposite sides of its vertical centerline with the ears projecting rearwardly; and, a pair of rigid telescopable arms corresponding to each set of three bracket-forming means, the adjacent extremities of said arms being pivotally connected to the forwardly-projecting ear of the bracket-forming means adapted for attachment to the wall surface for swinging movement in a common horizontal plane, and the remote ends of said telescopable arms being pivotally attached to the rearwardly-projecting ears of the remaining pair of bracket-forming means, said arms in telescoped position cooperating with said bracket-forming means to suspend the object supported thereby in close proximity to the adjacent wall surface, and said arms in extended position cooperating with said bracket-forming means to suspend said object in spaced relation to said wall surface.

2. The adjustable wall mount as set forth in claim 1 in which: two sets of three bracket-forming means and corresponding telescopable arms are mounted one above the other in vertically-spaced substantially parallel relation to one another.

3. The adjustable wall mount as set forth in claim 1 in which: each of the telescopable arms includes a horizontally-elongate member having a base portion pivotally attached adjacent the outer extremity thereof to the horizontal bearing surface of the inwardly projecting ear carried by the bracket-forming means adapted for attachment to the object to be hung and upturned end portions on opposite extremities of said base portion having horizontally-aligned openings therethrough, and an elongate rod mounted within the aligned openings in the upturned end portions of the horizontally-elongated member for horizontal sliding movement relative to the latter, the remote extremity of said rod carrying means adapted to engage the adjacent upturned end portion and limit the degree of relative movement therebetween into extended position, and the adjacent extremity of said rod being pivotally connected to the forwardly-projecting ear of the bracket-forming means adapted for attachment to the wall surface.

4. The adjustable wall mount as set forth in claim 1 in which: the axes of pivotal movement defined by the pivotal connections between the remote ends of the arms and the inturned ears of the bracket-forming means adapted for attachment to the object to be hung lie in a common vertical plane movable upon actuation of said arms from a position in front of the fixed axis of pivotal movement defined by the connection between the adjacent extremities of said arms and the forwardly-projecting ear of the third bracket-forming means to a position behind said last-mentioned fixed axis.

5. The adjustable wall mount as set forth in claim 1 in which: the bracket-forming means adapted for attachment to the wall surface is provided with two outturned ears arranged in spaced substantially parallel relation one above the other and which include at least one pair of vertically-aligned openings; and, in which means forming a pivot pin is mounted within said vertically-aligned openings, said means providing the pivotal connection between said outturned ear and the inner extremity of at least one of said telescopable arms.

6. The adjustable wall mount as set forth in claim 1 in which: the bracket-forming means adapted for attachment to the wall includes a single outturned ear having a single aperture therethrough; the adjacent ends of the telescopable arms each include openings vertically-alignable with one another and with the aperture in said outturned ear; a pivot pin having a head on one end thereof and a removable fastener on the other passes through the aligned openings in the arms and aperture in the outturned ear to form the pivotal connection therebetween, said pin being of a length in excess of the combined thicknesses of said arm ends and ear at the point of pivotal connection; and, in which a compression spring is mounted on said pivot pin in position to bias said arm ends and ear into tight frictional contact with one another.

7. The adjustable wall mount as set forth in claim 2 in which: the three bracket-forming means in each set thereof are arranged in horizontal alignment with the end pair spaced a fixed distance apart and the third one centered therebetween, and in which the corresponding bracket-forming means of both sets of three are located in vertical alignment with one another such that any adjacent pair of arm and bracket subassemblies may be extended and retracted substantially independently of the remaining adjacent pair for purposes of tilting the object supported thereby from side to side and forwardly and rearwardly.

8. The adjustable wall mount as set forth in claim 3 in which: the inner ends of the rods project inwardly beyond the adjacent upturned ends of the horizontally-elongate members when the telescopable arms defined thereby are in retracted position; a stop-forming means is provided on the inwardly-projecting end of each rod spaced from the adjacent upturned portion of the horizontally-elongate member; and, in which a compression spring is mounted upon the inwardly-projecting end of each rod between said stop-forming means and said adjacent upturned portion, said spring being operative to hold the telescopable arm with which it is associated in extended position.

9. The adjustable wall mount as set forth in claim 5 in which: the two vertically-spaced outturned ears include two pairs of horizontally-spaced vertically-aligned openings; in which the telescopable arms each include a fixed member pivotally attachced to the inturned ears of the bracket-forming means adapted for attachment to the object to be hung and a rod-like movable member mounted within the fixed member for reciprocating movement; and, in which the means forming a pivot pin comprises downturned portions on the inner adjacent ends of the rod-like members adapted to fit within the adjacent vertically-aligned pair of openings in the ears.

10. The adjustable wall mount as set forth in claim 8 in which: the axes of pivotal movement defined by the pivotal connections between the bases of the horizontally-elongate members and the bearing surfaces of the inturned ears of the bracket-forming means adapted for attachment to the object to be hung lie in a common vertical plane movable upon actuation of the arms from a position in front of the fixed axis of pivotal movement defined by the connection between the adjacent extremities of the rods and the forwardly-projecting ear of the third bracket-forming means to a position behind said last-mentioned fixed axis; and, in which the compression springs function in the fully-retracted position of the telescopable arms to releasably maintain said fixed axis of pivotal movement in front of said plane defined by said movable axes of pivotal movement.

References Cited

UNITED STATES PATENTS

| 256,460 | 4/1882 | Campbell | 248—490 |
| 597,426 | 1/1898 | Mumford | 248—495 |
| 1,209,582 | 12/1916 | Hoernegel | 248—495 XR |
| 1,609,837 | 12/1926 | Salt | 248—495 |

JOHN PETO, *Primary Examiner.*